United States Patent Office 2,708,604
Patented May 17, 1955

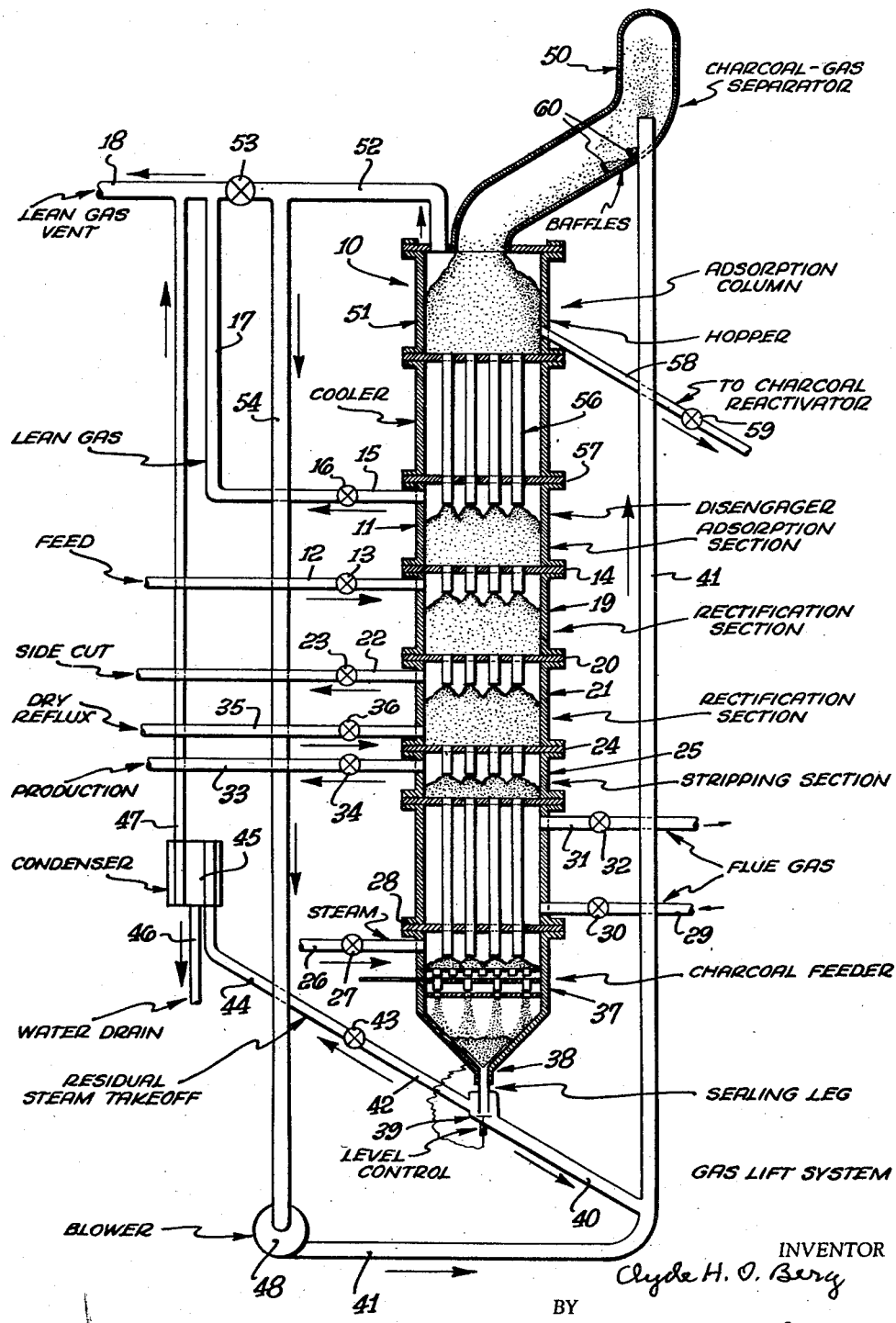

2,708,604

IMPACTLESS SEPARATOR

Clyde H. O. Berg, Long Beach, Calif., assignor to Union Oil Company of California, Los Angeles, Calif., a corporation of California Original application September 24, 1945, Serial No. 618,345. Divided and this application February 2, 1951, Serial No. 209,094

2 Claims. (Cl. 302—53)

This invention relates to the separation of powdered or granular solids from suspensions thereof in gaseous streams, which solid suspensions may occur in the gas conveyance of such solids, in industrial smokes or the like. Further, the invention relates to the conveyance of solids of powdered or granular form by means of a gas stream and contemplates improvements in the art of separating the solids from the gases in this manner of conveyance.

The transportation of solids by high velocity gas streams is well known in the art particularly in such processes as catalytic cracking wherein a powdered or granular catalyst may be transferred from the reactor to the regenerator and from the regenerator to the reactor by means of gas streams such as light hydrocarbons, regeneration gases, flue gas, and the like, or in the process of selective adsorption wherein gaseous mixtures are resolved into their components by adsorption on a solid adsorbent such as charcoal or silica, or the like, and in which a high velocity gas stream comprising either the feed gas or the lean gas produced in the process is utilized to transfer the solid adsorbent from the bottom to the top of the adsorption column. In other industrial processes the conveyance of solids by high velocity gas flow is employed as for example in the cement industry, or the like.

There are certain difficulties inherent in such a gas conveyance system paramount among which is the attrition of the solids so conveyed and the abrasion of the equipment employed. These occur as a result of the impingement of the solids traveling at high velocity against the metal surfaces of the equipment as may take place, for example, at bends in the conveyance system or in the separation means used at the termination of such conveyance system.

It is a primary object of my invention to provide a method of separating powdered or granular solids from a flowing gas stream, in which such solids are suspended, by a method which eliminates the attrition of the solids and the abrasion of the equipment by preventing the direct impingement of the solids on any of the metal surfaces of the conveyance system.

It is another object of my invention to provide a means of conveying powdered or granular solids between two points by utilizing a high velocity stream of gas in which the attrition of the solids and the abrasion of the equipment are substantially reduced.

In general my invention comprises the utilization of a gas cushion combined with a reduction of the velocity of gas flow in a gas conveyance system to effect the impactless separation of the solids of granular or powdered form from the gas stream employed as the conveyance medium.

The principles of my invention are particularly useful in connection with the operation of a charcoal adsorption plant utilizing such gaseous conveyance of the charcoal from the bottom of the adsorption column to the top thereof. The primary elements of my invention are illustrated in the drawing. In the drawing an apparatus is shown similar to the conventional countercurrent charcoal adsorption apparatus but differing therefrom in certain particulars so as to make possible the separation of a heart cut as hereinafter described, but primarily in the means for separating the charcoal from the gases in the gas lift conveyance of the charcoal.

Referring to the drawing, feed gas such as for example a hydrocarbon fraction containing $C_1$, $C_2$, and $C_3$ hydrocarbons is introduced to the adsorption section 11 of adsorption column 10 by means of line 12 controlled by valve 13 and is distributed within the adsorption section 11 by means of disengager 14. A solid bed of granular charcoal is caused to flow downwardly through the adsorption column at such a rate that substantially all of the heavier hydrocarbon components of the feed comprising $C_2$ and $C_3$ hydrocarbons are adsorbed in the charcoal in the adsorption section 11 while methane and lower boiling gases pass upwardly therein, a part of which is withdrawn from the adsorption section by means of line 15 controlled by valve 16 and pass through line 17 into the lean gas vent 18.

The saturated charcoal passes from adsorption section 11 through disengager 14 into rectification section 19 wherein equilibrium is established between the methane and lighter gases which may have been adsorbed and the $C_2$ and heavier hydrocarbons by refluxing the charcoal with the intermediate $C_2$ hydrocarbons which are released from the charcoal at a point lower in the column. Thus in rectification section 19 any residual methane or lighter gases which may have been adsorbed by the charcoal passing downwardly through disengager 14 are desorbed by virtue of the selective adsorption of the intermediate $C_2$ hydrocarbons which are allowed to pass upwardly through disengaging section 20 into rectification section 19. The charcoal substantially free of such lighter components passes from rectification section 19 through disengaging section 20 into a secondary rectification section 21. In section 21 the charcoal is refluxed with the heavier hydrocarbon components of the feed; i. e. $C_3$ and $C_4$ hydrocarbons to effect the desorption of the $C_2$ hydrocarbons, the level of $C_3$–$C_4$ reflux being controlled at a given point within the rectification section by means of a temperature control point within the section to measure the heat of adsorption of the $C_3$ and $C_4$ hydrocarbons and to control the reflux inlet valve. By injecting or otherwise introducing the heavier hydrocarbons into the rectification section 21 to serve as reflux therein the intermediate $C_2$ hydrocarbons are desorbed due to the preferential adsorption of the heavier hydrocarbons and migrate upwardly in the section insuring thereby the continued retention on the charcoal flowing downwardly from rectification section 19 of the heavier components. In this manner a $C_2$ heart cut may be withdrawn from the top of rectification section 21 by means of line 22 controlled by valve 23 which is comparatively free of either lighter or heavier components.

To further insure the production of a side cut containing a minimum of lighter components as impurities, valve 23 is so controlled that a small portion of the intermediate hydrocarbons desorbed in rectification section 21 are forced to pass upwardly through disengaging section 20 into initial rectification section 19 therein furnishing reflux for the down flowing charcoal to insure a substantially complete removal of the methane and lighter gases.

The charcoal substantially free of the intermediate components and lighter gases passes from rectification section 21 through disengager 24 into the steam stripping section 25. In this section steam is introduced by means of line 26 controlled by valve 27 at disengager 28 and flows upwardly through a fire heated tube bundle in the stripping sections. The tube bundle is heated by means of hot combustion gases or the like which are introduced by means of line 29, controlled by valve 30 and withdrawn from the tubular heater by means of line 31 controlled by valve 32. In this section the $C_3$ and heavier hydrocarbons and any residual intermediate hydrocarbons or lighter gases which may be still adsorbed on the charcoal are stripped from the charcoal together with the steam and are withdrawn by means of line 33 controlled by valve 34. These $C_3$ and heavier hydrocarbons are dried by condensation of the steam and separation thereof from the hydrocarbon phase and are reintroduced in the adsorption column at a point in rectification section 21 directly above disengager 24 by means of line 35 controlled by valve 36 to serve therein as reflux.

In an alternative method of furnishing heavy hydrocarbon reflux to rectification section 21 the take-off valve 34 in line 33 may be so controlled as to force a portion of the products from the stripping section; i. e. steam and hydrocarbons, predominantly $C_3$ and $C_4$ hydrocarbons, countercurrently to the charcoal flow through disengager 24 into the rectification section. There are, however, certain inherent disadvantages to this, what might be termed, "direct return reflux" paramount among which are the dilution of the hydrocarbons thereby reducing the efficiency of the refluxing action and moistening of the charcoal by a partial condensation of the steam which has the effect of impeding the free flow of the charcoal through the tubes in disengager 24 due to the tendency of the charcoal particles to adhere to each other or agglomerate when they become wet.

For these reasons we have found that decidedly improved results are obtained by removing the entire production from the stripping section, thus preventing any substantial flow back through disengager 24, separating the stripping steam from the hydrocarbon gases and returning the latter as substantially dry reflux to the lower portion of rectification section 21. These particular methods of reintroduction of the dry reflux are only illustrative of possible modes of operation and should not be construed as limiting the present invention in any of its aspects.

The charcoal flowing through the disengaging section 24 passes through the stripping section 25 as described, through the combustion gas heated tube bundle into the bottom of the adsorption column. It is at this point that the rate of flow of the charcoal through the column is most conveniently controlled. Any desired means of controlling this flow may be employed such as a rotating vane or the apportioning means as shown or the like. The charcoal passes through the feeder 37 into sealing leg 38, the length of which is dependent upon the type of feeder or flow regulator employed. In the drawing, a level control 39 is shown whereby the length of the sealing leg may be kept at a minimum by virtue of the fact that a build-up of charcoal can be induced in the bottom of the separator. The charcoal is released by the level control 39 flowing through transfer line 40 into the charcoal gas lift line 41. The drawing shows the use of a particular type of charcoal transfer system which permits substantially the complete removal of any steam accompanying the charcoal into the sealing leg by permitting a small portion of the gas in the gas lift system to pass from line 41 to flow countercurrently to the charcoal in transfer line 40 sweeping the steam out of the system through line 42 controlled by valve 43 and through line 44 into condenser 45. In the condenser the steam is separated from the small amount of lean gas used as a carrier therefor and may be withdrawn as water from the condenser by means of line 46, the lean gas passing through line 47 to the lean gas vent 18.

The charcoal flowing through transfer line 40 is picked up in line 41 by high velocity lean gas stream blown from blower 48 through line 41 and is carried therein to the impactless gas separator 50. Separator 50 illustrates one modification of the present invention utilizing a reduction in the velocity of the gas stream by an increase in the effective diameter of flow and a formation of a gas cushion at the top of the separator, the combination of these effects resulting in the settling of the suspended solids from the gas stream without directing impingement thereof on any of the metal surfaces of the separator. The height of the upper portion 50a of separator 50 above the point of injection of the gas-solid stream from the termination of line 41 will be dependent upon the velocity of gas flow in line 41 and upon the relative density of the solids to be separated. This distance should be controlled so as to prevent the suspended solids from reaching the upper limits thereof thus preventing impact of these solids with the top of the separator. In general I have found that the height of this upper portion 50a of separator 50 which acts as a flow reversing chamber may be less than the normal trajectory of the moving particles due to the gas cushion which is formed in the upper portion thereof. This gas cushion has the effect of damping the trajectory sufficiently to prevent the impingement of the solids on the upper surfaces of the chamber. For optimum results, however, I have found that the height of the flow reversing chamber above the point of ejection of the gaseous stream should be equivalent to at least one-half of the normal trajectory of the moving particles in still air.

The principle of preventing the suspended solids from impinging upon any metal surfaces is further carried out according to the specific separator illustrated in the drawing by placing one or more baffles such as baffles 60 and 61 on the floor of the lower portion 50b of said separator thereby causing a layer of the solid, in this case charcoal, to be retained thereon and to function as a cushion upon which subsequent solids settling from the gas stream may fall. In the particular process described the charcoal flows from the impactless separator 50 into hopper 51 the lean gas employed in the gas lift passing out of hopper 51 into line 52 wherefrom it is recycled by means of line 54 to blower 48 to be recirculated in the conveyance system. Since as shown in the drawing the lift gas and the charcoal both pass downward through the lower portion 50b of the separator into hopper 51, this line 50b also acts as a transfer line. Furthermore, since the hopper 51 is of larger diameter than the transfer line it inherently acts as a settling chamber; and since in hopper 51 the gas and the charcoal no longer pass in the same direction as in line 50b, but travel separately, the charcoal going downward and the lift gas upward, hopper 51 also acts as a gas separation chamber.

The charcoal is further dried by controlling valve 16 on the lean gas draw-off line 15 from the adsorption section 11 so that a portion of the lean gas is forced to flow through the cooling tubes into cooler 56 countercurrently to the charcoal flow and through hopper 51 into the lean gas exit line 52. It is to be understood that the primary element of my invention is the provision of the process whereby the charcoal may be conveyed by means of a high velocity gas stream from the bottom of the adsorption column to the top thereof without encountering excessive destruction of the charcoal by attrition or excessive wear of equipment by abrasion that is normally encountered in a gas lift system.

The charcoal employed in the above process is preferably granular, about 10 to 40 mesh, although sizes as large as about 4 mesh and as small as about 100 mesh may also be employed. By "charcoal" herein is meant activated carbon, animal or vegetable charcoal, and the like, although an activated form of carbon or charcoal is preferred. After long usage, small amounts of highly adsorbable materials may accumulate in the charcoal and impair its efficiency somewhat. The charcoal may then be withdrawn as provided in the attached drawing by line 58 from hopper 51 and can usually be reactivated by high temperature roasting, and returned through charcoal introduction line 58a and valve 59a.

Although the above description of the usage of the impactless separator of my invention was with regard to its usage in a charcoal adsorption plant in which a hydrocarbon fraction, composed essentially of $C_1$, $C_2$, and $C_3$ hydrocarbons, was separated into its components, it is to be understood that the impactless separator may be employed in any adsorption plant where the conveyance of the adsorbent by gas lift is employed, and its utility is in no way effected by the type of feed to the unit. Further the apparatus of the present invention is not confined to usage in adsorption processes but is applicable and effective in any operation in which powdered or granular solids are conveyed by means of a gas stream.

The degree of adsorbability of gases on charcoal is generally higher for the gases of higher colecular weight. There appears to be a rough correlation between adsorbability and critical temperature. Thus, gases of low critical temperature, such as hydrogen, nitrogen, oxygen, and carbon monoxide are adsorbed to a lesser degree than gases of higher critical temperature, such as chlorine, sulfur dioxide, hydrogen sulfide, ammonia, nitrous oxide, carbon dioxide, and the like. Among the hydrocarbons there is a marked increase in adsorbability with molecular weight. Thus, the process may be employed for the separation of hydrocarbon vapors of higher molecular weight from those of lower molecular weight, as in the adsorption of natural gasoline from natural gas. It may also be used for purification or concentration of readily adsorbable gases from mixtures in which they are contained.

There are many modifications of the above process which may be employed. Although granular charcoal of about 10 to 40 mesh is preferred, larger granules up to about 2 mesh may be employed in some instances. When concurrent flow of stripping gas and charcoal is employed, the stripping may be accomplished by lifting the charcoal to the impactless separator while heating it at the same time. In another modification, the stripping gas may be sufficiently preheated to supply the bulk or all of the necessary stripping heat.

Whereas, the general principles of my invention have been described and illustrated with respect to its utilization in a charcoal adsorption process, it is not intended that such usage be construed as a limitation of my invention inasmuch as impactless separator as described may be employed in any gas conveyance system for the impactless separation of suspended solids from the gas.

Many modifications in the particular apparatus which may be designed with the intention of utilizing the principles of my invention will occur to those skilled in the art without departing from the spirit or scope of the invention, which comprises essentially the utilization of the combined effects of a reduction of the velocity of the gas conveying stream and of the formation of a gas cushion at the terminal point of said stream to prevent the solids suspended in said stream from impinging directly on any metal surfaces with sufficient velocity to destroy a portion of the solids by attrition and to cause the excessive wear of the equipment by abrasion.

This application is a division of my copending application Serial No. 618,345, filed September 24, 1945, now abandoned.

Having described and illustrated my invention with reference primarily to the principles thereof and secondarily to the two particular modes of utilization of these principles and not wishing to be limited thereby as many modifications will occur to those skilled in the art without departing from the spirit and scope of the invention, I claim:

1. An apparatus for the conveyance of solid granular particles of about 10 to 40 mesh size without substantially reducing their size by attrition which comprises a gas cushioned flow reversing chamber closed at its upper end, a vertical conveyance line which is straight from bottom to top and the upper end of which enters the open lower end of said flow reversing chamber, said flow reversing chamber having substantially larger diameter than said conveyance line, means for passing a lift gas through said conveyance line and thereby conveying said solid particles through said conveyance line into said flow reversing chamber without direct impingement on the surfaces of said conveyance line and said flow reversing chamber, a settling chamber below and to the side of said flow reversing chamber adapted to receive the lift gas and solid particles leaving the open lower end of said flow reversing chamber, a transfer line adapted to transfer the solid particles and the gas stream leaving the open lower end of said flow reversing chamber to said settling chamber, said transfer line having baffles located in the floor thereof so as to cause a layer of the solid particles to be retained thereon as a cushion, and means for separately withdrawing said solid particles and said lift gas from said settling chamber.

2. In an apparatus for circulating friable granular solids of greater size than approximately 40 mesh through a cyclic path, the improvement which comprises a gas lift line which is entirely straight from bottom to top, a flow reversing chamber of larger cross section, the upper end of which is closed and the lower portion of which encloses the top of said lift line, a separating chamber of still larger cross section below and to one side of the flow reversing chamber, a transfer line adapted to transfer the entire stream of solid particles and lift gas from the lower end of said flow reversing chamber to the upper portion of said separating chamber, said transfer line having baffles located in the floor thereof so as to cause a layer of solid particles to be retained thereon as a cushion, means for separately withdrawing solid particles and lift gas from said separating chamber, means for returning at least a portion of said solid particles to the lower portion of said lift line, and means for introducing lift gas into the bottom of said lift line.

References Cited in the file of this patent

UNITED STATES PATENTS

| | | |
|---|---|---|
| 1,422,007 | Soddy | July 4, 1922 |
| 1,498,630 | Jensen | June 24, 1924 |
| 1,825,707 | Wagner | Oct. 6, 1931 |
| 2,106,869 | Falkenstein | Feb. 1, 1938 |
| 2,414,373 | Gerhold | Jan. 14, 1947 |
| 2,429,359 | Kassel | Oct. 21, 1947 |

FOREIGN PATENTS

| | | |
|---|---|---|
| 278,858 | Germany | July 18, 1913 |